United States Patent
Chi (10) Patent No.: US 6,715,211 B1
(45) Date of Patent: Apr. 6, 2004

(54) MOUNTING AND FIXING STRUCTURE OF A HANDLE AND A TOOL HEAD OF A HAND TOOL

(76) Inventor: Chih-Sung Chi, No. 140, Lane 476, Sec. 2, Jong-Ping Rd., Tai-Ping City, Taichung Hsien (TW)

( * ) Notice: Subject to any disclaimer, the term of this patent is extended or adjusted under 35 U.S.C. 154(b) by 192 days.

(21) Appl. No.: 10/082,276

(22) Filed: Feb. 26, 2002

(51) Int. Cl.⁷ .................................................. B25G 3/02
(52) U.S. Cl. ........................................ 30/340; 30/329
(58) Field of Search .................. 30/340, 329, 337, 30/342, 339, 392–394; 606/177, 176, 185, 167; 279/2.02, 2.05, 9.1, 20.1

(56) References Cited

U.S. PATENT DOCUMENTS

| | | | | |
|---|---|---|---|---|
| 3,927,893 A | * | 12/1975 | Dillon et al. ................. | 279/75 |
| 4,020,555 A | * | 5/1977 | Hedrick ........................ | 30/392 |
| 4,083,112 A | * | 4/1978 | Palm ............................ | 30/335 |
| 4,864,727 A | * | 9/1989 | Chu ........................... | 30/272.1 |
| 5,175,934 A | * | 1/1993 | Chao ........................... | 30/329 |
| 5,265,343 A | * | 11/1993 | Pascaloff ..................... | 30/339 |
| 5,481,949 A | * | 1/1996 | Yen ............................. | 81/438 |
| 5,661,909 A | * | 9/1997 | Kondo et al. ................. | 30/392 |
| 5,697,947 A | * | 12/1997 | Wolf et al. .................. | 606/185 |
| 6,209,208 B1 | * | 4/2001 | Marinkovich et al. ........ | 30/392 |

* cited by examiner

Primary Examiner—Allan N. Shoap
Assistant Examiner—Phong Nguyen (57) ABSTRACT

A mounting and fixing structure of a handle and a tool head of a hand tool includes an urging ring, a fixing seat, a saw blade, an insertion shank, an insertion pin, and a screw. In such a manner, the saw blade may be retained by the insertion shank rigidly and stably, and the insertion shank may be secured in the mounting hole of the socket of the handle rigidly and stably, so that the saw blade may be secured on the handle rigidly and stably.

5 Claims, 8 Drawing Sheets

MOUNTING AND FIXING STRUCTURE OF A HANDLE AND A TOOL HEAD OF A HAND TOOL

BACKGROUND OF THE INVENTION

1. Field of the Invention

The present invention relates to a mounting and fixing structure of the handle and the tool head of a hand tool, and more particularly to a mounting and fixing structure of the handle and the tool head of a hand tool, wherein the saw blade may be secured on the handle rigidly and stably, thereby enhancing the safety of using the hand tool.

2. Description of the Related Art

Figure 9:
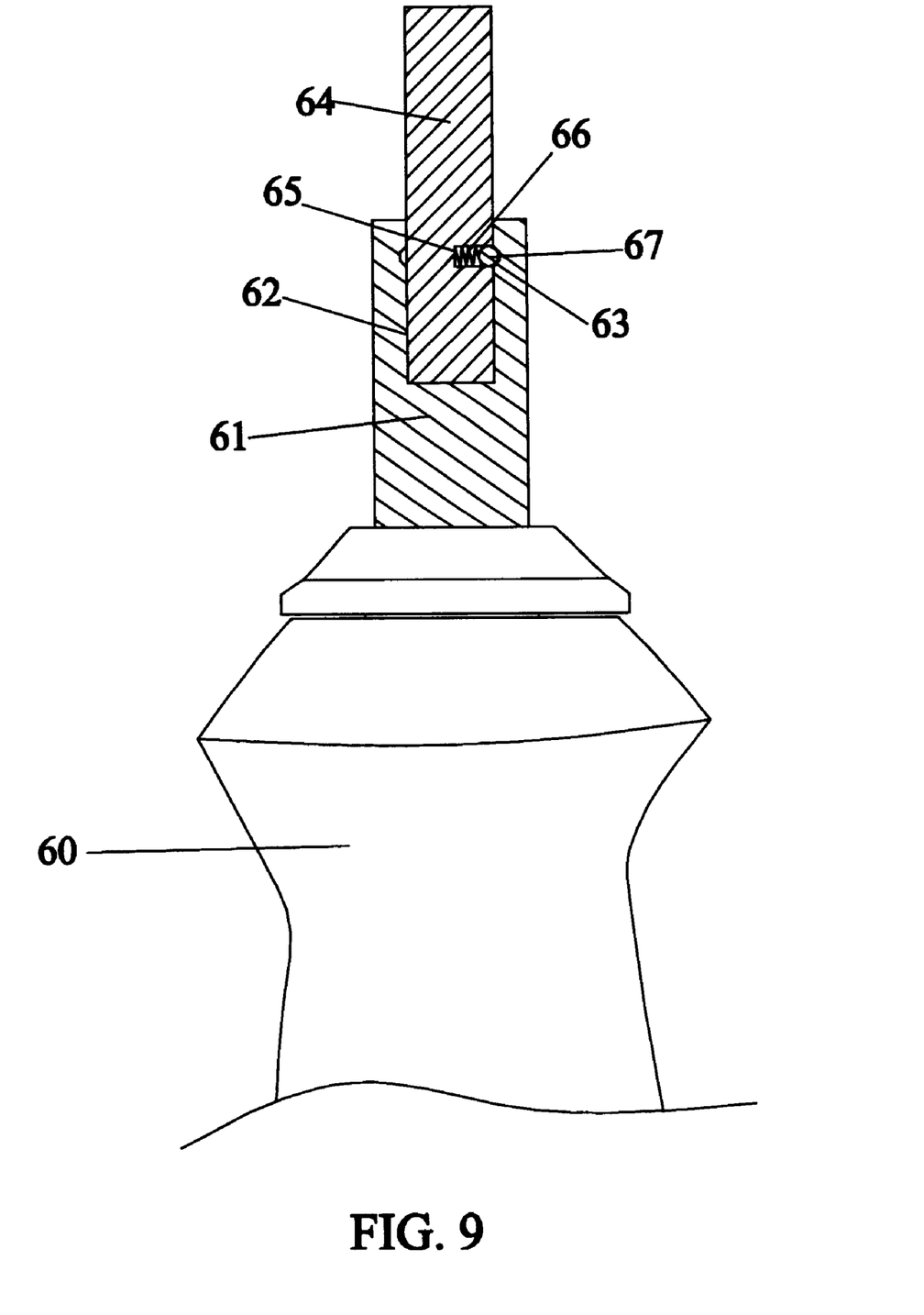
FIG. 9 is a partially cut-away side plan cross-sectional assembly view of a conventional mounting and fixing structure of the handle and the tool head of a hand tool in accordance with the prior art.

A conventional mounting and fixing structure of the handle and the tool head of a hand tool in accordance with the prior art shown in FIG. 9 comprises a handle 60 having one end provided with a socket 61 formed with a mounting hole 62 which has a wall formed with an annular groove 63 for securing a ball 67. An insertion shank 64 may be inserted into the mounting hole 62 of the socket 61, and is formed with a receiving recess 65 for receiving a spring 66 that may press the ball 67 into the annular groove 63 of the socket 61. The insertion shank 64 may be combined with a tool head such as a saw blade.

However, the conventional mounting and fixing structure of the handle and the tool head of a hand tool in accordance with the prior art has the following disadvantages.

1. When a larger pulling force is applied on the insertion shank 64, the ball 67 is easily detach from the annular groove 63 of the socket 61, so that the insertion shank 64 is easily detached from the mounting hole 62 of the socket 61.

2. The insertion shank 64 is easily detached from the mounting hole 62 of the socket 61, thereby causing a safety problem.

3. The ball 67 is directly forced into the annular groove 63 of the socket 61 when in use, thereby producing a large friction between the ball 67 and the wall of the annular groove 63 of the socket 61, so that the parts of the conventional mounting and fixing structure of the handle and the tool head of a hand tool are easily worn out.

SUMMARY OF THE INVENTION

The present invention has arisen to mitigate and/or obviate the disadvantage of the conventional mounting and fixing structure of the handle and the tool head of a hand tool.

The primary objective of the present invention is to provide a mounting and fixing structure of the handle and the tool head of a hand tool, wherein the saw blade may be secured on the handle rigidly and stably, thereby enhancing the safety of using the hand tool.

Another objective of the present invention is to provide a mounting and fixing structure of the handle and the tool head of a hand tool, wherein the saw blade may be retained by the insertion shank rigidly and stably, and the insertion shank may be secured in the mounting hole of the socket of the handle rigidly and stably, so that the saw blade may be secured on the handle rigidly and stably.

A further objective of the present invention is to provide a mounting and fixing structure of the handle and the tool head of a hand tool, wherein the annular tapered face of the urging ring may force the ball into the groove of the first end of the insertion shank smoothly and conveniently, thereby decreasing the friction between the urging ring and the ball, and thereby increasing the lifetime of the parts.

In accordance with the present invention, there is provided a mounting and fixing structure of the handle and the tool head of a hand tool, comprising a handle, an urging ring, a fixing seat, a saw blade, an insertion shank, an insertion pin, and a screw, wherein:

the handle has a distal end provided with a connector, the connector has one end provided with a socket which is formed with a non-circular mounting hole, the socket has a periphery for insertion of a ball which is partially protruded outward from the periphery of the socket;

the urging ring is mounted on the outer wall of the socket;

the fixing seat is formed with a passage, and an insertion hole communicating with the passage, the fixing seat has a side face formed with a screw hole communicating with the insertion hole, and a pin hole communicating with the insertion hole;

the saw blade has one end formed with an insertion portion inserted into the passage of the fixing seat;

the insertion shank has a first end that may be inserted into the mounting hole of the socket, and a second end that may be inserted into the insertion hole of the fixing seat, the first end of the insertion shank is formed with a groove for insertion of the ball, the second end of the insertion shank has a first side formed with a pin hole that may align with the pin hole of the fixing seat;

the insertion pin is extended through the pin hole of the fixing seat, and is inserted into the pin hole of the insertion shank, thereby fixing the fixing seat on the insertion shank; and the screw is screwed into the screw hole of the fixing seat, and is urged on the first side of the second end of the insertion shank.

Further benefits and advantages of the present invention will become apparent after a careful reading of the detailed description with appropriate reference to the accompanying drawings.

DETAILED DESCRIPTION OF THE INVENTION

Figure 1:
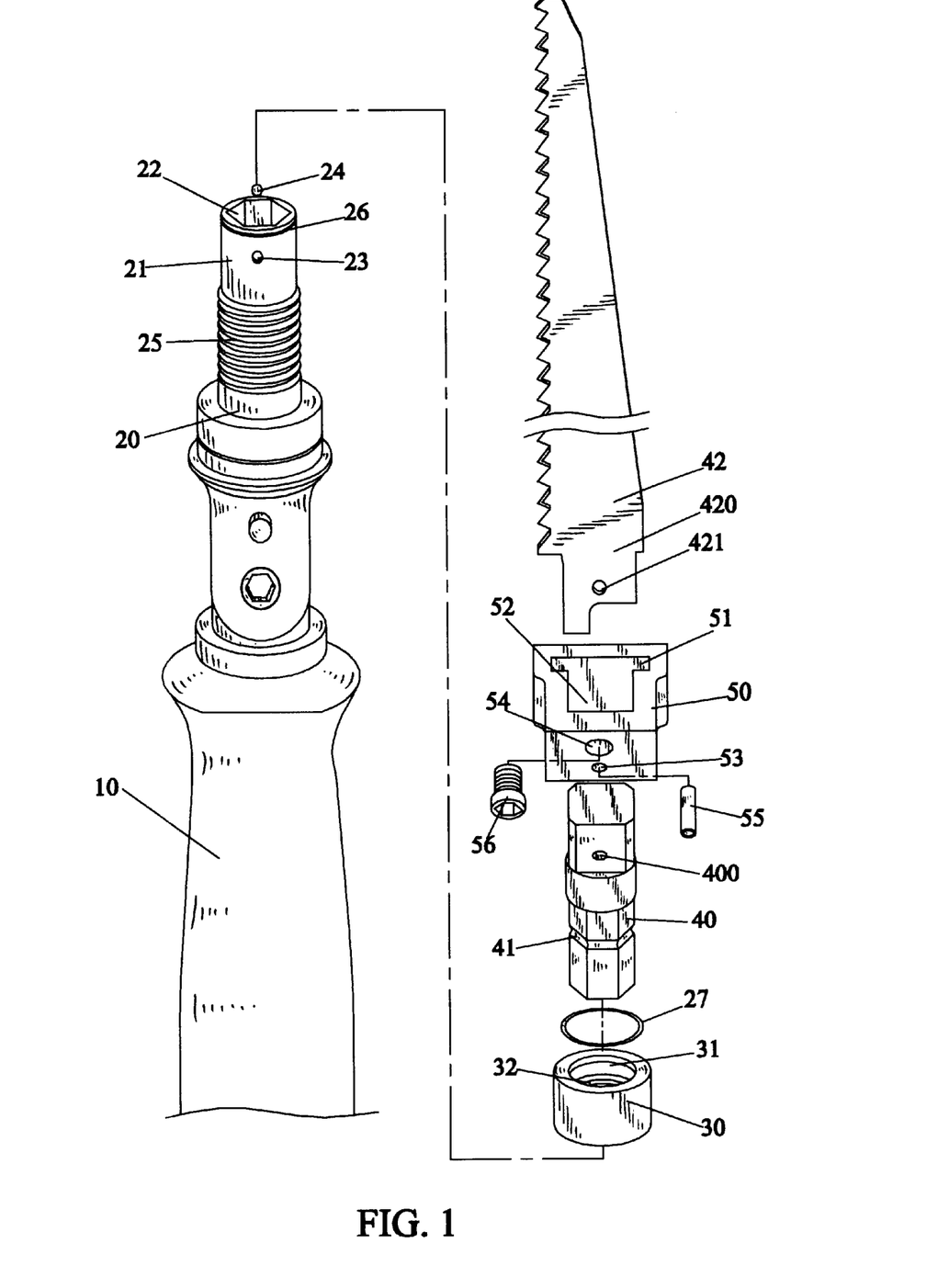
FIG. 1 is an exploded perspective schematic view of a mounting and fixing structure of the handle and the tool head of a hand tool in accordance with a preferred embodiment of the present invention.
Figure 2:
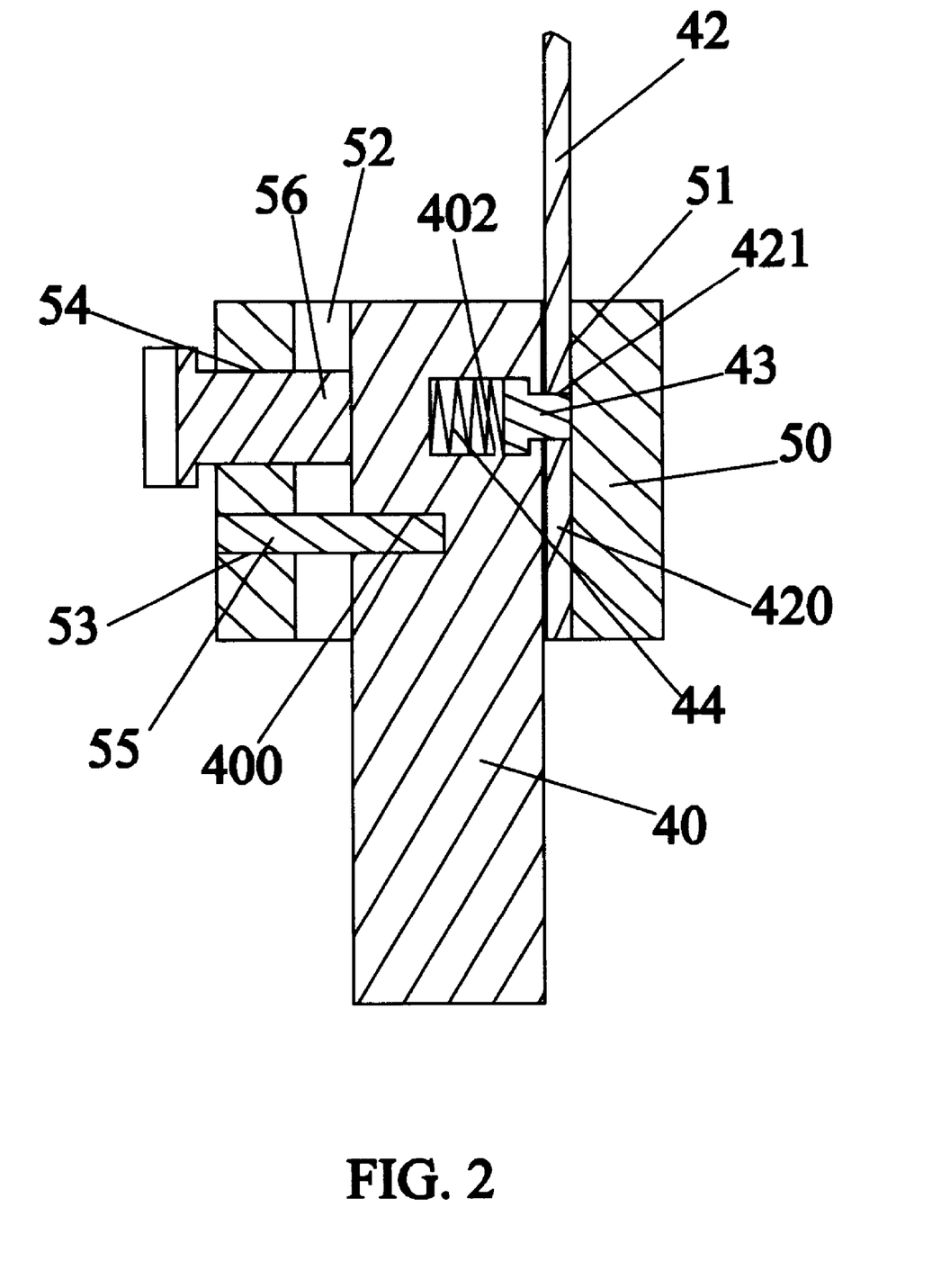
FIG. 2 is a partially cut-away side plan cross-sectional assembly view of the mounting and fixing structure of the handle and the tool head of a hand tool as shown in FIG. 1.
Figure 3:
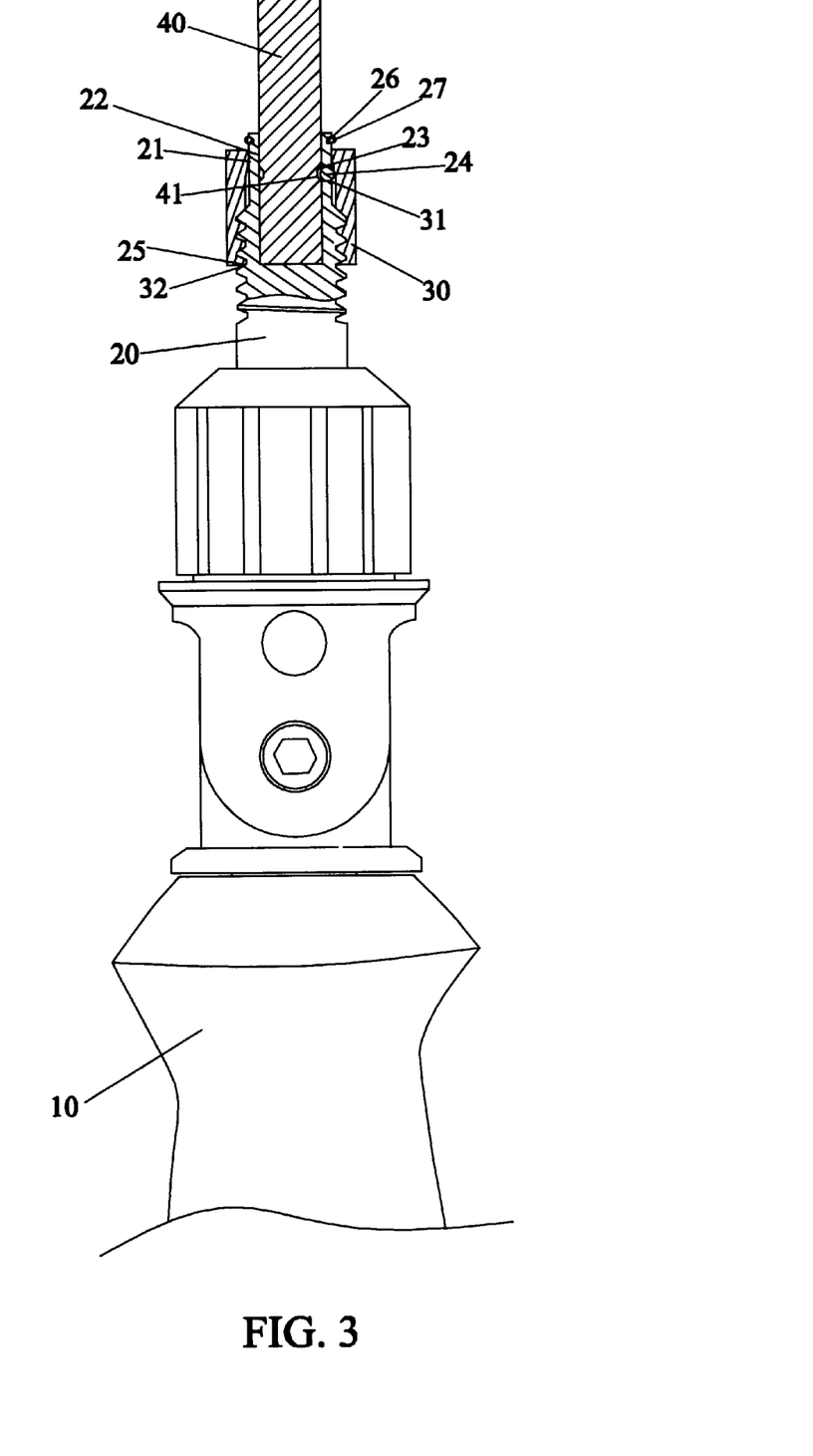
FIG. 3 is a partially cut-away side plan cross-sectional assembly view of the mounting and fixing structure of the handle and the tool head of a hand tool as shown in FIG. 1.

Referring to the drawings and initially to FIGS. 1–3, a mounting and fixing structure of the handle and the tool head of a hand tool in accordance with a preferred embodiment of the present invention comprises a handle 10, an urging ring 30, a fixing seat 50, a saw blade 42, an insertion shank 40, an insertion pin 55, and a screw 56.

The handle 10 has a distal end provided with a connector 20. The connector 20 has an outer wall formed with an outer thread 25. The connector has one end provided with a socket 21 which is formed with a non-circular (preferably hexagonal) mounting hole 22. The socket 21 has a periphery formed with a through hole 23 communicating with the mounting hole 22. A ball 24 is movably mounted in the through hole 23 of the socket 21, and is partially protruded outward from the through hole 23 of the socket 21. The socket 21 has an outer wall formed with an annular groove 26 for securing a C-shaped snap ring 27.

The urging ring 30 is mounted on the outer wall of the socket 21, and has an inner wall having a first end formed with an inner thread 32 screwed on the outer thread 25 of the socket 21 and having a second end formed with an annular tapered face 31.

The fixing seat 50 is formed with a passage 51, and an insertion hole 52 communicating with the passage 51. The fixing seat 50 has a side face formed with a screw hole 54 communicating with the insertion hole 52, and a pin hole 53 communicating with the insertion hole 52.

The saw blade 42 has one end formed with an insertion portion 420 inserted into the passage 51 of the fixing seat 50, the insertion portion 420 of the saw blade 42 is formed with a through hole 421.

The insertion shank 40 has a first end that may be inserted into the mounting hole 22 of the socket 21, and a second end that may be inserted into the insertion hole 52 of the fixing seat 50. The first end of the insertion shank 40 is formed with a groove 41 that may align with the through hole 23 of the socket 21 for insertion of the ball 21. The second end of the insertion shank 40 has a first side formed with a pin hole 400 that may align with the pin hole 53 of the fixing seat 50.

The insertion pin 55 is extended through the pin hole 53 of the fixing seat 50, and is inserted into the pin hole 400 of the insertion shank 40, thereby fixing the fixing seat 50 on the insertion shank 40.

The screw 56 is screwed into the screw hole 54 of the fixing seat 50, and is urged on the first side of the second end of the insertion shank 40.

In assembly, referring to FIGS. 3–8 with reference to FIGS. 1 and 2, the insertion pin 55 is extended through the pin hole 53 of the fixing seat 50, and is inserted into the pin hole 400 of the insertion shank 40, thereby securing the fixing seat 50 on the insertion shank 40. Then, the insertion portion 420 of the saw blade 42 is inserted into the passage 51 of the fixing seat 50. Then, the screw 56 is screwed into the screw hole 54 of the fixing seat 50, and is urged on the first side of the second end of the insertion shank 40, thereby forcing the insertion shank 40 toward the insertion portion 420 of the saw blade 42, so as to clamp the insertion portion 420 of the saw blade 42 in the passage 51 of the fixing seat 50, so that the insertion portion 420 of the saw blade 42 may be secured in the passage 51 of the fixing seat 50, and may be retained by the locking pin 43 of the insertion shank 40 as shown in FIG. 2.

Figure 4:
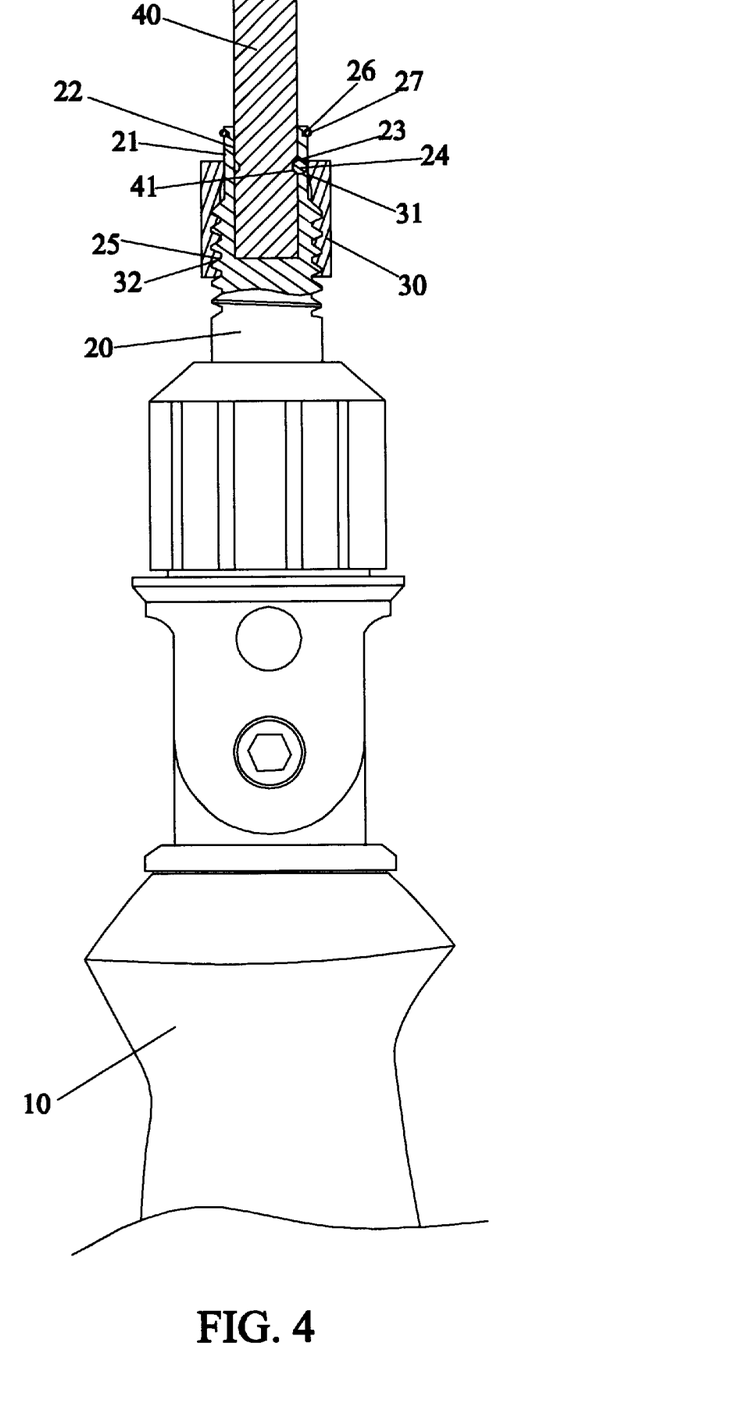
FIG. 4 is a schematic operational view of the mounting and fixing structure of the handle and the tool head of a hand tool as shown in FIG. 3 in use.
Figure 5:
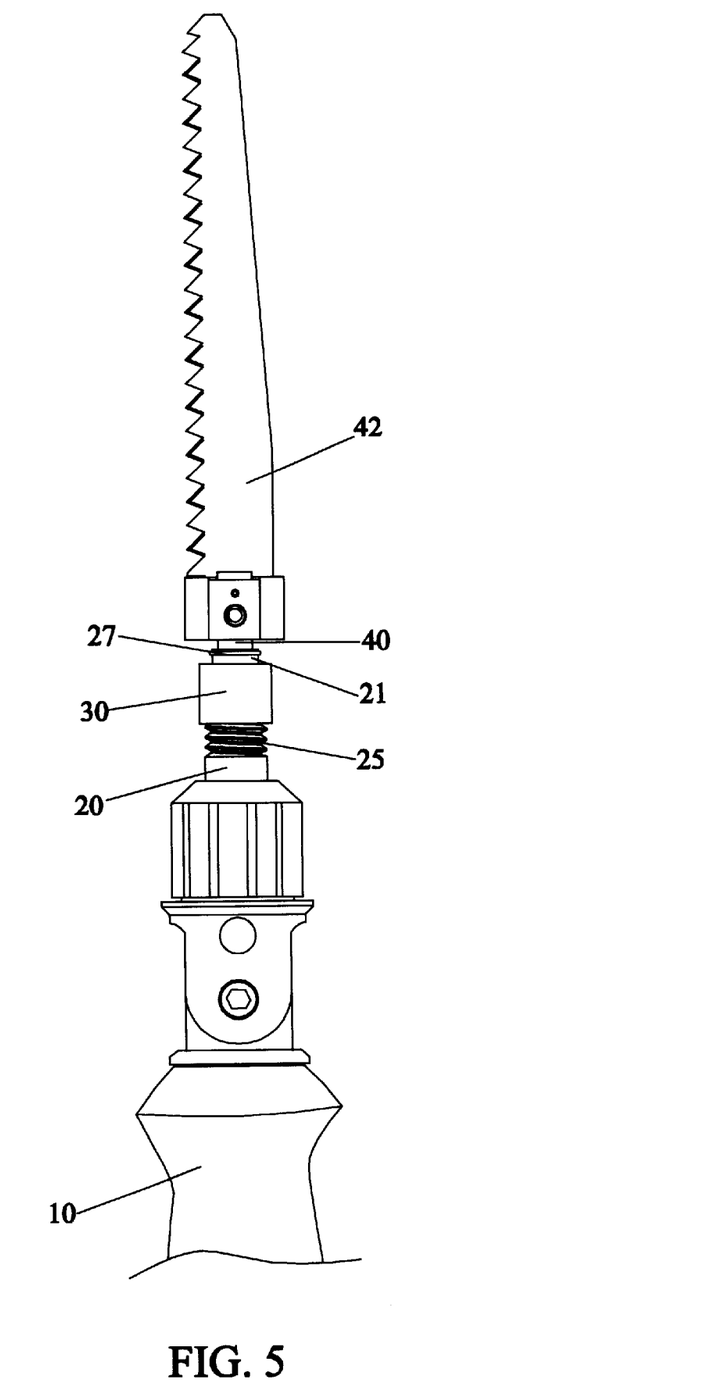
FIG. 5 is a partially cut-away side plan assembly view of the mounting and fixing structure of the handle and the tool head of a hand tool as shown in FIG. 1.
Figure 6:
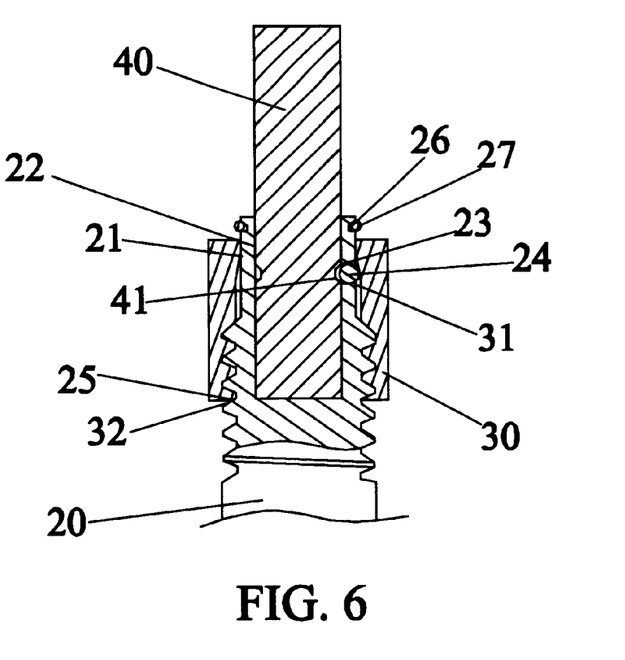
FIG. 6 is a partially cut-away side plan cross-sectional assembly view of the mounting and fixing structure of the handle and the tool head of a hand tool as shown in FIG. 1.
Figure 7:
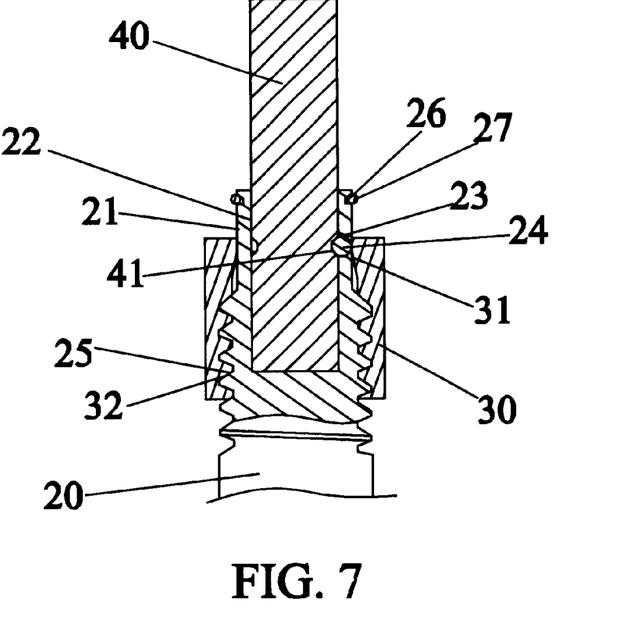
FIG. 7 is a schematic operational view of the mounting and fixing structure of the handle and the tool head of a hand tool as shown in FIG. 6 in use.
Figure 8:
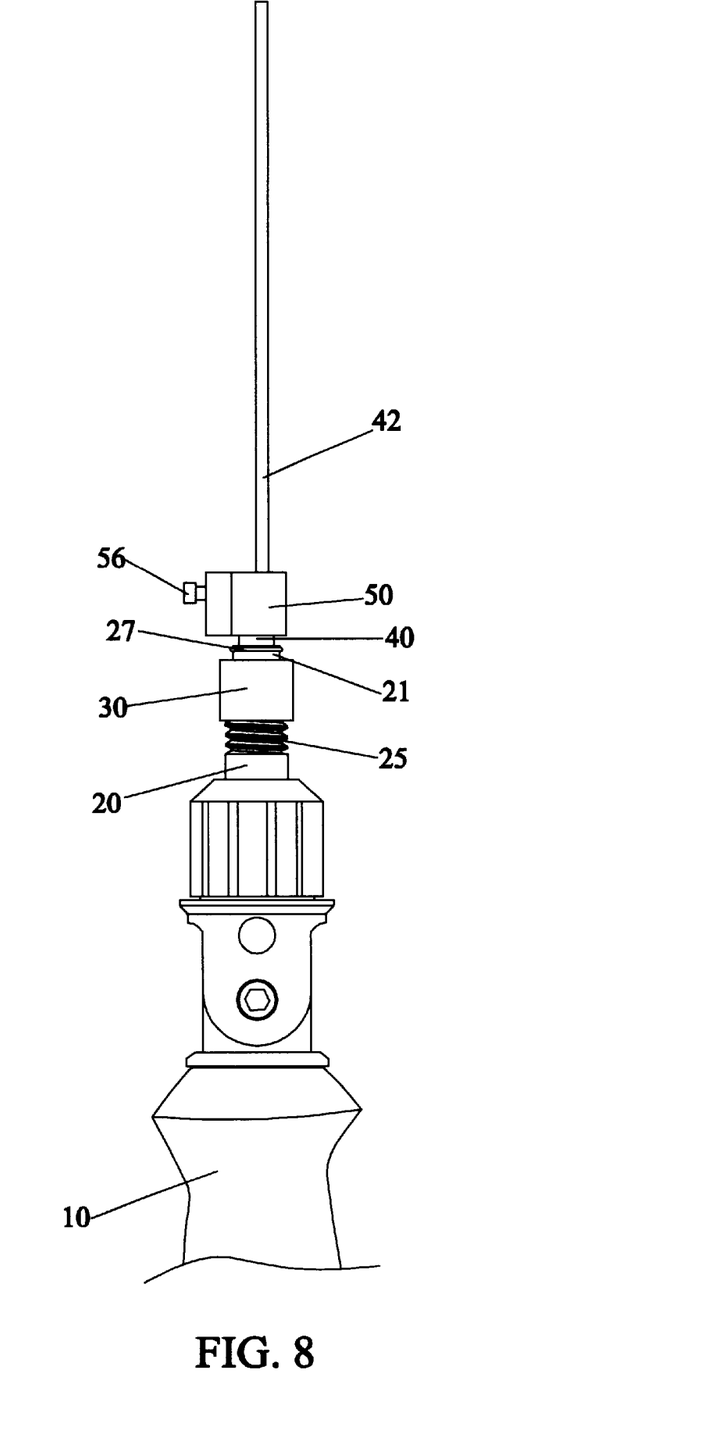
FIG. 8 is a partially cut-away side plan assembly view of the mounting and fixing structure of the handle and the tool head of a hand tool as shown in FIG. 1.

The urging ring 30 is initially mounted on the outer wall of the socket 21. Then, the urging ring 30 may be rotated relative to the socket 21 to move to an upper portion of the socket 21 as shown in FIGS. 3 and 6, whereby the annular tapered face 31 of the urging ring 30 is detached from the through hole 23 of the socket 21, so that the ball 24 may be moved freely. Then, the first end of the insertion shank 40 may be inserted into the mounting hole 22 of the socket 21, and the groove 41 of the first end of the insertion shank 40 may align with the through hole 23 of the socket 21 for allowing insertion of the ball 21. Then, the urging ring 30 may be rotated relative to the socket 21 to move to a lower portion of the socket 21 as shown in FIGS. 4 and 7, whereby the annular tapered face 31 of the urging ring 30 may be aligned with the through hole 23 of the socket 21, and may force the ball 24 into the groove 41 of the first end of the insertion shank 40, thereby securing the first end of the insertion shank 40 by the ball 24 in the mounting hole 22 of the socket 21 by the urging ring 30. Thus, the ball 23 may be rigidly and stably secured in the groove 41 of the first end of the insertion shank 40 by compression of the urging ring 30, so that the insertion shank 40 may be secured in the mounting hole 22 of the socket 21 of the handle 10 rigidly and stably. Thus, the saw blade 42 may be secured on the handle 10 rigidly and stably as shown in FIGS. 5 and 8.

Especially referring to FIGS. 1 and 2, the second end of the insertion shank 40 has a second side formed with a receiving chamber 402 that may align with the through hole 421 of the insertion portion 420 of the saw blade 42. A locking pin 43 is movably mounted in the receiving chamber 402 of the insertion shank 40, and is partially protruded outward from the receiving chamber 402 of the insertion shank 40 into the passage 51 of the fixing seat 50 as shown in FIG. 2. A spring 44 is mounted in the receiving chamber 402 of the insertion shank 40, and is urged between a wall of the receiving chamber 402 of the insertion shank 40 and the locking pin 43 for urging the locking pin 43 to partially protrude outward from the receiving chamber 402 of the insertion shank 40 into the passage 51 of the fixing seat 50 as shown in FIG. 2. Thus, the locking pin 43 may pass through the through hole 421 of the insertion portion 420 of the saw blade 42, so that the insertion portion 420 of the saw blade 42 may be secured in the passage 51 of the fixing seat 50, and may be retained by the locking pin 43 of the insertion shank 40. Thus, the saw blade 42 may be retained by the insertion shank 40 rigidly and stably.

Accordingly, the mounting and fixing structure of the handle and the tool head of a hand tool in accordance with a preferred embodiment of the present invention has the following advantages.

1. The saw blade 42 may be retained by the insertion shank 40 rigidly and stably, and the insertion shank 40 may be secured in the mounting hole 22 of the socket 21 of the handle 10 rigidly and stably, so that the saw blade 42 may be secured on the handle 10 rigidly and stably.

2. The saw blade 42 may be secured on the handle 10 rigidly and stably, thereby enhancing the safety of using the hand tool.

3. The annular tapered face 31 of the urging ring 30 may force the ball 24 into the groove 41 of the first end of the insertion shank 40 smoothly and conveniently, thereby decreasing the friction between the urging ring 30 and the ball 24, and thereby increasing the lifetime of the parts.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A mounting and fixing structure of a handle and a tool head of a hand tool, comprising a handle, an urging ring, a fixing seat, a saw blade, an insertion shank, an insertion pin, and a screw, wherein:

the handle has a distal end provided with a connector, the connector has one end provided with a socket which is formed with a non-circular mounting hole, the socket has a periphery for insertion of a ball which is partially protruded outward from the periphery of the socket;

the urging ring is mounted on the outer wall of the socket;

the fixing seat is formed with a passage, and an insertion hole communicating with the passage, the fixing seat has a side face formed with a screw hole communicating with the insertion hole, and a pin hole communicating with the insertion hole;

the saw blade has one end formed with an insertion portion inserted into the passage of the fixing seat;

the insertion shank has a first end that may be inserted into the mounting hole of the socket, and a second end that may be inserted into the insertion hole of the fixing seat, the first end of the insertion shank is formed with a groove for insertion of the ball, the second end of the insertion shank has a first side formed with a pin hole that may align with the pin hole of the fixing seat;

the insertion pin is extended through the pin hole of the fixing seat, and is inserted into the pin hole of the insertion shank, thereby fixing the fixing seat on the insertion shank; and the screw is screwed into the screw hole of the fixing seat, and is urged on the first side of the second end of the insertion shank.

2. The mounting and fixing structure of the handle and the tool head of a hand tool in accordance with claim 1, wherein the connector has an outer wall formed with an outer thread, and the urging ring has an inner wall having a first end formed with an inner thread screwed on the outer thread of the socket and having a second end formed with an annular tapered face that may urge the ball.

3. The mounting and fixing structure of the handle and the tool head of a hand tool in accordance with claim 1, wherein the periphery of the socket is formed with a through hole communicating with the mounting hole for receiving the ball.

4. The mounting and fixing structure of the handle and the tool head of a hand tool in accordance with claim 1, wherein the socket has an outer wall formed with an annular groove for securing a C-shaped snap ring.

5. The mounting and fixing structure of the handle and the tool head of a hand tool in accordance with claim 1, wherein the insertion portion of the saw blade is formed with a through hole, the second end of the insertion shank has a second side formed with a receiving chamber that may align with the through hole of the insertion portion of the saw blade, a locking pin is movably mounted in the receiving chamber of the insertion shank, and is partially protruded outward from the receiving chamber of the insertion shank into the through hole of the insertion portion of the saw blade, a spring is mounted in the receiving chamber of the insertion shank, and is urged between a wall of the receiving chamber of the insertion shank and the locking pin for urging the locking pin to partially protrude outward from the receiving chamber of the insertion shank into the through hole of the insertion portion of the saw blade.

* * * * *